Figure 1:
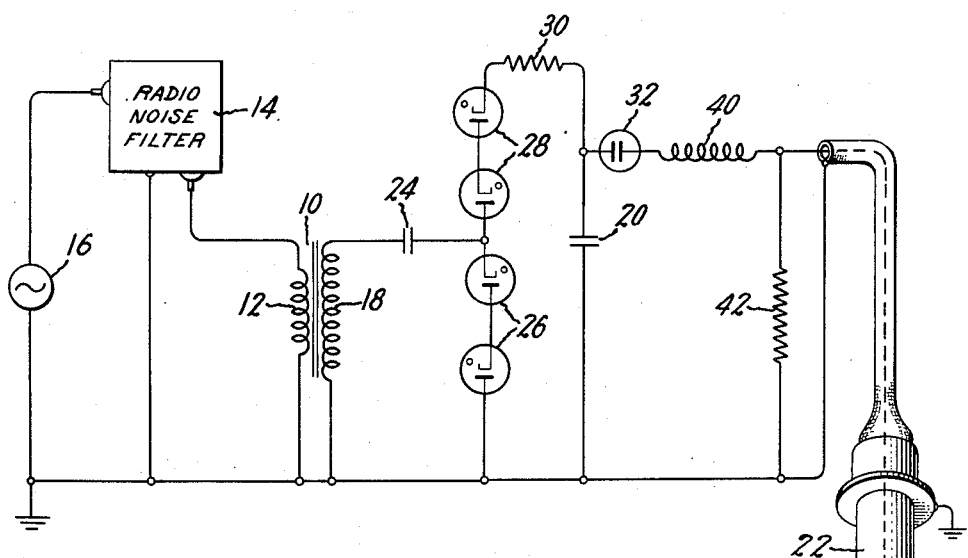

July 16, 1957  E. W. LAUTENBERGER  2,799,809
CAPACITOR DISCHARGE IGNITION SYSTEM
Filed March 1, 1956

Inventor:
Elmer W. Lautenberger,
by Roe D. McBurnett
His Attorney.

United States Patent Office 2,799,809
Patented July 16, 1957

2,799,809

CAPACITOR DISCHARGE IGNITION SYSTEM

Elmer W. Lautenberger, Scotia, N. Y., assignor to General Electric Company, a corporation of New York Application March 1, 1956, Serial No. 568,737

8 Claims. (Cl. 317—83)

This invention relates to electric spark ignition apparatus and more specifically to ignition systems of capacitor discharge type for igniting fuel mixtures in combustion gas turbines and other applications, particularly those wherein ignition need not be precisely timed.

As usually constructed, ignition systems of the type described include a main energy storage capacitor connected to discharge recurrently across the ignitor plug gap or gaps, and a high voltage D.-C. power supply circuit for charging the energy storage capacitor preparatory to each such discharge. Normally the capacitor charging circuit includes a step-up transformer having its primary winding energized by an A.-C. or pulsating D.-C. current source and its secondary winding connected to charge the energy storage capacitor. In such systems the charging current in the capacitor-transformer circuit is limited only by the normally very low impedance of the capacitor and transformer; hence if left uncontrolled the charging current may become so high as to cause burn-out of the transformer or failure of other circuit components. For this reason, it is necessary in these prior systems to include in the charging circuit additional means for limiting the charging current to the main energy storage capacitor.

This necessary charging rate control commonly has been provided either by use of current limiting resistors or by use of primary series reactors or high reactance transformers in the charging circuit. Resistors are wasteful of power, of course, and they also dissipate excessive heat which must be disposed of. High reactance transformers and reactors generally have very low power factor, and they therefore require addition of a power factor correction capacitor unless they are to impose a relatively high volt-ampere load on the alternator or other power supply used. Such transformers also are relatively large in size and weight, and because only half-wave rectification can practicably be used with them transformer utilization is very low.

The present invention has as its principal object the provision of capacitor discharge ignition apparatus not subject to the foregoing and other weaknesses and disadvantages of prior ignition apparatus of capacitor discharge type. Another object of the invention is the provision of such ignition apparatus characterized by minimum size and weight for given rated output, and which provides optimum power factor, volt-ampere requirement and electrical efficiency.

Still another object of the invention is the provision of a capacitor discharge ignition system wherein the spark discharge is oscillatory in nature and means are provided for limiting reverse flow from the energy storage capacitor through its charging circuit during such oscillatory discharge.

It is also an object of the invention to provide a capacitor discharge ignition system incorporating a cascade voltage doubler providing automatic charge current limiting and including means for limiting reverse current flow from the main energy storage capacitor during oscillatory discharge thereof.

In carrying out the invention in one form, there is provided a main energy storage capacitor, a charging circuit therefor, and a discharge circuit connecting the capacitor for oscillatory discharge through the associated ignition gap. The charging circuit is of cascade voltage doubler type and includes a step-up transformer providing A.-C. output through a first cold cathode rectifier to a sparking rate control capacitor, to charge such control capacitor during a first portion of the transformer output voltage cycle. The main discharge capacitor is connected through a second cold cathode rectifier into the control capacitor-transformer circuit, so as to be incrementally charged by current flow through the control capacitor during a second portion of the transformer output voltage cycle. During this latter portion of the voltage cycle, the control capacitor and transformer output voltages are additive to thus provide a voltage doubling action. Additionally, the control capacitor by reason of its small size relative to the main energy storage capacitor and its series connection therewith, acts to limit the quantity of charge which can pass to the main energy storage capacitor during each cycle of transformer output voltage. The rectifiers, the input transformer and its power supply thus are protected against excessive currents, without the power losses characteristic of prior systems utilizing resistors or high reactance transformers for charge current limiting.

For best efficiency, it is desirable that fixed resistance in the capacitor discharge circuit be kept as low as possible, since the discharge currents are very high and power losses across any fixed resistance in the circuit would be correspondingly high. With low fixed resistance, however, discharge of the main energy storage capacitor cannot be critically damped and it therefore is necessarily oscillatory in nature. During such oscillatory discharge, the polarity of the capacitor charge reverses and becomes such that a momentary reverse current flows from the main capacitor to the rectifiers through which the capacitor initially was charged. In accordance with the invention, the peak surge of this reverse current flow is limited in magnitude by including, in the charging circuit, a small resistor of a size such that the resistor does not significantly affect the charging current but does effectively limit reverse current to a maximum safely handled by the rectifiers without flashing or damage thereto.

Figure 2:
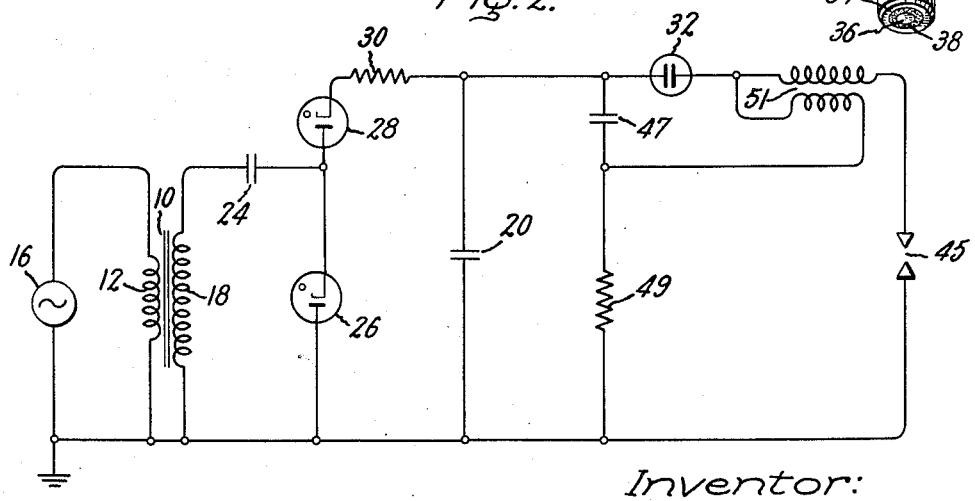

My invention will itself be further understood and its various objects, features and advantages more fully appreciated by reference to the appended claims and the following detailed description when read in conjunction with the accompanying drawings, wherein:

Fig. 1 is a schematic circuit diagram of one form of spark ignition apparatus embodying the invention; and Fig. 2 is a schematic circuit diagram of similar apparatus as applied to a spark ignition system of high tension type.

With continued reference to the drawings, wherein like reference numerals have been used throughout to designate like elements, Fig. 1 illustrates the invention as embodied in a low tension ignition system. As shown, the system comprises a voltage step-up input transformer 10 having its primary winding 12 connected through a radio noise filter 14, which may be of any suitable type, to an A.-C. current source as diagrammatically indicated at 16. The A.-C. power supply 16 may be of alternator type or, if preferred, D.-C. supply voltage converted to A.-C. by a vibrator or the like may instead be used.

The secondary winding 18 of input transformer 10 forms part of a cascade voltage doubler circuit which charges the main energy storage capacitor 20 preparatory to each discharge thereof through the associated ignitor plug 22. This voltage doubler circuit includes a control capacitor 24 connected in series circuit relation with the secondary winding 18 of transformer 10, and with one or more rectifiers 26 which permit only unidirectional current flow in the series loop completed thereby. A second unidirectional flow means comprising one or more rectifiers 28 is connected into this series loop, the connection being such that the rectifiers 28 permit current flow through the transformer secondary 18 and control capacitor 24 in series, in the direction opposite to that permitted by rectifiers 26. The current flow through rectifiers 28 constitutes the charging current for the main energy storage capacitor 20, to which the rectifiers 28 are connected by a resistor 30. The purpose and operation of this resistor 30 will be fully explained hereinafter.

It is to be understood that rectifiers 26 and 28 may have their connections reversed if desired, the polarity of charge applied to the main energy storage capacitor 20 being merely a matter of choice. Rectifiers 26 and 28 preferably are of cold cathode gas tube type. Hot cathode rectifiers require heating time and individual high voltage filament transformers, both of which are objectionable in aircraft ignition applications. Metallic semi-conductor type rectifiers also are possible but generally are more restricted on maximum ambient temperature ratings and also are more expensive by reason of the fact a large number of series connected units must be used to provide the necessarily high voltage rating.

In operation, rectifiers 26 become conductive during a first portion of the transformer secondary voltage cycle and cause the control capacitor 24 to be charged to or nearly to the peak value of secondary voltage. During a second portion of the voltage cycle, rectifiers 26 become non-conductive; rectifiers 28 next become conductive and the transformer secondary current flows through control capacitor 24, rectifiers 28 and resistor 30, to the main energy storage capacitor 20. The main capacitor therefore takes an increment of charge in each cycle of transformer output voltage.

Since the control capacitor is charged nearly to the peak value of secondary voltage during one portion of the voltage cycle, and since current flow during another portion of the cycle is reversed in the portion of the circuit in which the control capacitor is located, the voltage to which this capacitor originally was charged is additive to that produced in the transformer secondary during such other portion of the voltage cycle. Accordingly, the total available voltage output to the main energy storage capacitor may be up to double that of the peak value of transformer secondary voltage.

The voltage doubler circuit thus is effective to increase the available transformer output voltage, and at the same time it serves to control the quantity of charge delivered to the energy storage capacitor 20 during each cycle of transformer output voltage. Since all current flow to the energy storage capacitor must pass through the control capacitor 24, the rate at which the energy storage capacitor is charged is determined by the relative sizes of the two capacitors. The control capacitor 24 is smaller than the energy storage capacitor 20, so that the control capacitor operates to charge the energy storage capacitor by a plurality of relatively small voltage "steps," one during each cycle of transformer output voltage. Depending on the sparking rate desired for the particular application, the ratio of sizes of the two capacitors may vary from say two-to-one to several hundred-to-one or even higher for very low sparking rates.

Actually, transformer 10 never "sees" the main energy storage capacitor 20 that it ultimately is charging, but rather sees only the capacitive load of the small control capacitor 24 or even less, since during the portion of the voltage cycle in which the two capacitors are in series relation the resultant capacity then is smaller than that of control capacitor 24. Current flow in the transformer secondary thus is effectively limited by the size of capacitor 24 and is substantially independent of the size of main energy storage capacitor 20. Accordingly, the rectifiers 26 and 28, transformer 10 and its power supply 16 all are protected against excessive current flow during the charging cycle, and since the control capacitor 24 consumes little or no power in performing its current limiting and voltage doubling functions, the power losses in the circuit are quite small as compared to conventional circuits utilizing either high reactance transformers or resistance type current limiting means.

Capacitor 24 also serves to control the rate at which spark discharges occur at the ignitor plug; i. e., the number of sparks per unit time. The number of cycles of input voltage necessary to charge the main energy storage capacitor 20 to the desired discharge voltage determines the plug sparking rate, and the number of cycles necessary to do so can readily be varied by changing the value of the control capacitor to adjust the quantity of electrical charge which it passes to the energy storage capacitor in each cycle of input voltage.

A control gap 32 is incorporated in the ignitor or discharge circuit to accurately determine the voltage at which spark discharge occurs. This control gap 32 may comprise a pair of spark electrodes disposed in spaced relation within a sealed envelope filled with an inert gas so that breakdown voltage will be substantially constant despite ambient temperature and pressure changes. In operation, control gap 32 ionizes when capacitor 20 is fully charged and permits discharge of the capacitor across the electrodes of ignitor plug 22. The discharge circuit also may include an inductance element 40 for prolonging discharge current flow to thereby improve effectiveness of ignition.

In the low tension systems shown in Fig. 1, the ignition electrodes 34 and 36 of ignitor plug 22 are bridged by a body or layer of semi-conductive material 38 comprised by a deposit either initially applied to the plug or formed during operation thereof. Such semi-conductive bridge is not essential to operation of the system, but it is of advantage in that it serves in well known manner to reduce the voltage at which a spark discharge can occur between the plug electrodes. An ignitor plug of this general construction and mode of operation is fully explained in the copending application of C. J. Watters, Serial No. 441,730, filed July 7, 1954, and assigned to the assignee of the present application.

As noted above, the discharge circuit including main energy storage capacitor 20 and ignitor plug 22 preferably is arranged to include as little fixed resistance as possible, so as to minimize power losses in the circuit. The necessarily low fixed resistance of the discharge circuit prevents its being critically dampened, hence the discharge current flow must be oscillatory in nature.

Oscillatory discharge in systems wherein the energy storage capacitor is charged through a rectifier leads to difficulties in that during oscillatory discharge of the capacitor the polarity of the voltage across it reverses one or more times, and on polarity reversal the voltage relationships become such that the rectifiers become conductive and in effect short the capacitor. While the amount of electrical energy thus lost is relatively small, the instantaneous flow through the rectifiers during this reversal of polarity of the capacitor charge may reach magnitudes such that damage ensues to the rectifier tubes by reason of excessive current flows therethrough.

In accordance with the invention, rectifier tube damage during oscillatory discharge of the energy storage capacitor is prevented by inclusion of a current limiting resistor in the charging circuit, preferably between rectifiers 28 and the main capacitor 20 as shown. In a typical ignition system wherein the A.-C. voltage supply is 110 volts at 400 cycles and transformer 10 steps this supply voltage up to about 2600 volts R. M. S., and wherein the main energy storage capacitor 20 has a value of 0.5 mfd. and control capacitor 24 a value of 0.0025 mfd., resistor 30 preferably has a value of from 300 to 1000 ohms. In such a circuit, a 300 ohm resistor will limit peak surge reverse current so that rectifier flashing is only barely perceptible and not injurious to the rectifiers, and a resistance of 500 to 1000 ohms will pevent all visible flashing. Resistors having even higher resistance values, say up to about 5000 ohms, may be used if desired, without introducing excessively high power losses during the charging cycle.

It is to be understood that resistor 30 has as its purpose the limiting of current flow only during discharge of the main energy storage capacitor 20; it is not intended to limit charging current flow to the main capacitor during the charging cycle. Since the resistor is physically located in the charging circuit, however, it does incidentally perform a current limiting function during the charging cycle. To minimize this charge current limiting function and the attendant power losses, resistor 30 preferably has a resistance value only just large enough to limit the peak surge reverse current through rectifiers 38 and 26 to safe magnitudes during oscillatory discharge of the main capacitor.

In prior circuits wherein a resistor is used to limit charging current, the resistor generally has a resistance value of the order of 50,000 ohms. It therefore is believed apparent that resistor 30 in the circuit of Fig. 1, typically having a value of about 500 ohms, is ineffective to significantly limit charging current. As previously explained, charge current limiting in the circuit of the invention is instead provided by the small control capacitor 24, which determines the quantity of charge that can flow into the main energy storage capacitor 20 during each cycle of the alternating input voltage.

Other impedance elements may, if desired, be used in preference to the resistor 30 for accomplishing the same purpose. For example, an inductor or other reactor could be substituted for the resistor and power losses in the circuit probably would be slightly reduced by so doing. However, resistance elements generally are to be preferred because of their good reliability and low cost; and since the resistor need not be large in order to fulfill its intended purpose in the circuit, power losses in the resistor are so small as to be easily tolerable.

As noted above, the ignition system of Fig. 1 is of low tension type. Fig. 2 illustrates the charging circuit of the invention as embodied in a high tension system wherein discharge across the ignitor occurs at much higher voltages. In Fig. 2 the charging circuit components including transformer 10, control capacitor 24, rectifiers 26 and 28, reverse current limiting resistor 30 and the main energy storage capacitor 20, all are arranged similarly to Fig. 1 and therefore require no further description.

The discharge circuit of Fig. 2 differs from that of Fig. 1, however, in that it includes means for initiating or "triggering" discharge through the ignitor gap 45 without use of any semiconductive type electrode shunt as at 38 in Fig. 1. This triggering means preferably is of the type disclosed and claimed in my Patent No. 2,697,184 issued December 14, 1954, and as shown it comprises a triggering capacitor 47 which is connected in series circuit relation with a resistor 49 and connected into the charging circuit so as to be charged simultaneously with the energy storage capacitor 20. Triggering capacitor 47 preferably is relatively small as compared to the main capacitor 20, its charging rate being adjusted to correspond to that of the main capacitor by proper selection of the value of its series resistor 49.

The ignitor electrodes 45 are connected across the main capacitor 20, in series with a control gap 32 and the secondary of a pulse transformer 51. The primary of this transformer is connected in series with the triggering capacitor 47, to form a triggering circuit connected across the control gap 32. Preferably the fixed resistance of this triggering circuit is small and less than the critical value so that discharge therethrough is oscillatory in nature.

In this circuit the control gap acts as a hold-off control independent of altitude and air speed, so that discharge cannot be initiated until the triggering capacitor 47 is charged to predetermined voltage. When such predetermined voltage is attained, control gap 32 ionizes and the triggering capacitor then discharges through the control gap and the primary winding of transformer 51. This discharge current induces in the transformer secondary winding a high impulse voltage, which adds to the main capacitor voltage in the main discharge circuit. The sum of these voltages is sufficient to break down the ignition gap, thereby to release the main capacitor charge.

While I have described and illustrated by way of example only certain preferred embodiments of my invention in the foregoing, many modifications will occur to those skilled in the art and it therefore should be understood that the appended claims are intended to cover all such modifications as fall within the true spirit and scope of the invention.

What I claim as new and desire to secure by Letters Patent of the United States is:

1. In combination in electrical spark ignition apparatus, a cascade voltage doubler network having an alternating voltage input and a unidirectional voltage output through a control capacitor, an ignition system connected to be energized by said voltage doubler network and including a main energy storage capacitor relatively larger than said control capacitor and connected to be incrementally charged therethrough, means for connecting said main energy storage capacitor to a spark ignition device for oscillatory discharge therethrough, and an impedance element connected in said voltage doubling network in series circuit relation with said main energy storage capacitor for limiting peak surge reverse current to said voltage doubler network from said main energy storage capacitor during oscillatory discharge thereof and consequent reversal in polarity of the charge thereon.

2. In combination in electrical spark ignition apparatus, a cascade voltage doubler network including a control capacitor and having an alternating voltage input and a unidirectional voltage output through said voltage doubling capacitor, an ignition system including a main energy storage capacitor relatively larger than said control capacitor and connected to be incrementally charged therethrough, means for connecting said main energy storage capacitor to a discharge circuit arranged for oscillatory current flow and including a spark ignition device, and a resistance element connected in said voltage doubling network in series circuit relation with said main energy storage capacitor for limiting peak surge reverse current to said voltage doubler network from said main energy storage capacitor during oscillatory discharge thereof through said discharge circuit.

3. In a capacitor discharge spark ignition system including a spark ignition device and high voltage A.-C. supply means, a first capacitor connected for oscillatory discharge through said ignition device, a second capacitor having a capacitance value small as compared to said first capacitor, unidirectional current flow means connected to permit current flow from said high voltage supply means only to said second capacitor during a first portion of the alternating supply voltage cycle and to permit current flow from said high voltage supply means to said first and second capacitors in series relation during another portion of the supply voltage cycle whereby said first capacitor is incrementally charged through said smaller second capacitor during such other portion of the supply voltage cycle, a resistance element connected in series circuit relation with said first capacitor and said unidirectional current flow means for limiting peak surge reverse current from said first capacitor through said unidirectional current flow means during oscillatory discharge of said first capacitor through said ignition device.

4. In a capacitor discharge ignition system including a spark ignition device and high voltage A.-C. supply means, a first capacitor connected for oscillatory discharge through said device, a second capacitor having a capacitance value small as compared to said first capacitor, a pair of cold cathode gas rectifier tubes connected to permit current flow from said high voltage supply means only to said second capacitor during one portion of the alternating supply voltage cycle and to permit current flow from said high voltage supply means to said first and second capacitors in series relation during another portion of the supply voltage cycle whereby said first capacitor is incrementally charged through said smaller second capacitor during such other portion of the voltage cycle, and a resistance element connected in series circuit relation with said first capacitor and said unidirectional current flow means for limiting peak surge reverse current from said first capacitor through said unidirectional current flow means during oscillatory discharge of said first capacitor through said ignition device.

5. In a capacitor discharge ignition system including a spark ignition device and high voltage A.-C. supply means, a first capacitor connected for oscillatory discharge through said ignition device, a second capacitor relatively smaller than said first capacitor, unidirectional current flow means connected to permit current flow from said high voltage supply means only to said second capacitor during a first portion of each cycle of the alternating supply voltage and to permit current flow from said high voltage supply means to said first and second capacitors in series relation during another portion of each supply voltage cycle whereby said first capacitor is incrementally charged through said smaller second capacitor during such other portion of the cycle, and a resistor having a resistance value of approximately 300 to 5000 ohms connected in series circuit relation with said first capacitor and said unidirectional current flow means for limiting peak surge reverse current from said first capacitor through said unidirectional current flow means during oscillatory discharge of said first capacitor through said ignition device.

6. In a capacitor discharge ignition system including a spark ignition device and high voltage A.-C. supply means, a first capacitor connected for oscillatory discharge through said ignition device, a second capacitor having a capacitance value many times smaller than that of said first capacitor, unidirectionl current flow means connected to permit current flow from said high voltage supply means only to said second capacitor during one portion of each cycle of the alternating supply voltage and to permit current flow from said high voltage supply means to said first and second capacitors in series relation during the other portion of each cycle of supply voltage whereby said first capacitor is incrementally charged through said smaller second capacitor during such other portion of the voltage cycle, and a resistor having a resistance value of approximately 300 to 5000 ohms connected in series circuit relation with said first capacitor and said unidirectional current flow means for limiting peak surge reverse current from said first capacitor through said unidirectional current flow means during oscillatory discharge of said first capacitor through said ignition device.

7. In an electric spark ignition system for supplying a recurrent arc discharge between a pair of spark ignition electrodes, in combination: a main energy storage capacitor; a discharge circuit having a low fixed resistance and connecting said main energy storage capacitor for oscillatory discharge through said ignition electrodes; a charging circuit connected to charge said main energy storage capacitor preparatory to each such discharge thereof, said charging circuit including a high voltage A.-C. source, a plurality of unidirectional current flow devices, and a second capacitor relatively smaller than said main energy storage capacitor, with said A.-C. source, said unidirectional current flow devices and said main energy storage and second capacitors being so connected that during a first portion of each cycle of the alternating supply voltage said second capacitor is charged through one of said unidirectional current flow devices and during another portion of the supply voltage cycle said main energy storage capacitor and said second capacitor are connected in series flow relation with said A.-C. source through another of said unidirectional current flow devices, whereby said main energy storage capacitor is charged through said second capacitor in increments determined by the relative sizes of the two capacitors; and impedance means connected between said main energy storage capacitor and said charging circuit, said impedance means being of impedance value such that charging current is but slightly affected thereby and peak surge reverse current to the charging circuit from said main energy storage capacitor due to polarity reversal during oscillatory discharge thereof is effectively limited to protect said unidirectional current flow means against excessive current flow.

8. In an electric spark ignition system for supplying a recurrent arc discharge between a pair of spark ignition electrodes, in combination: a main energy storage capacitor; a discharge circuit having low fixed resistance connecting said main energy storage capacitor for oscillatory discharge through connecting said main energy storage capacitor for oscillatory discharge through said ignition electrodes and including inductance means for prolonging the period of each such discharge; a charging circuit connected to charge said main energy storage capacitor preparatory to each discharge thereof, said charging circuit including a high voltage A.-C. source, a pair of cold cathode gas rectifier tubes, and a second capacitor relatively smaller than said main energy storage capacitor, with said A.-C. source, said rectifiers and said main energy storage and second capacitors being so connected that during one portion of the alternating supply voltage said second capacitor is charged through one of said rectifiers and during the other portion of the supply voltage cycle said main energy storage capacitor and said second capacitor are connected in series circuit relation with the other of said rectifiers and said A.-C. source whereby said main energy storage capacitor is charged through said second capacitor in increments determined by the relative sizes of the two capacitors; and a resistance element connected between said main energy storage capacitor and said charging circuit, said resistance element having a resistance value such that charging current is not significantly limited thereby and peak surge reverse current to said charging circuit from said main energy storage capacitor due to polarity reversal during oscillatory discharge of said capacitor is effectively limited to protect the rectifiers against excessive current flow.

References Cited in the file of this patent

UNITED STATES PATENTS

| | | |
|---|---|---|
| 2,536,143 | Short et al. | Jan. 2, 1951 |
| 2,544,477 | West | Mar. 6, 1951 |